July 12, 1938.   T. HOBLER   2,123,467
PROCESS FOR THE PRODUCTION OF HIGHLY CONCENTRATED NITRIC ACID
Filed Aug. 12, 1935
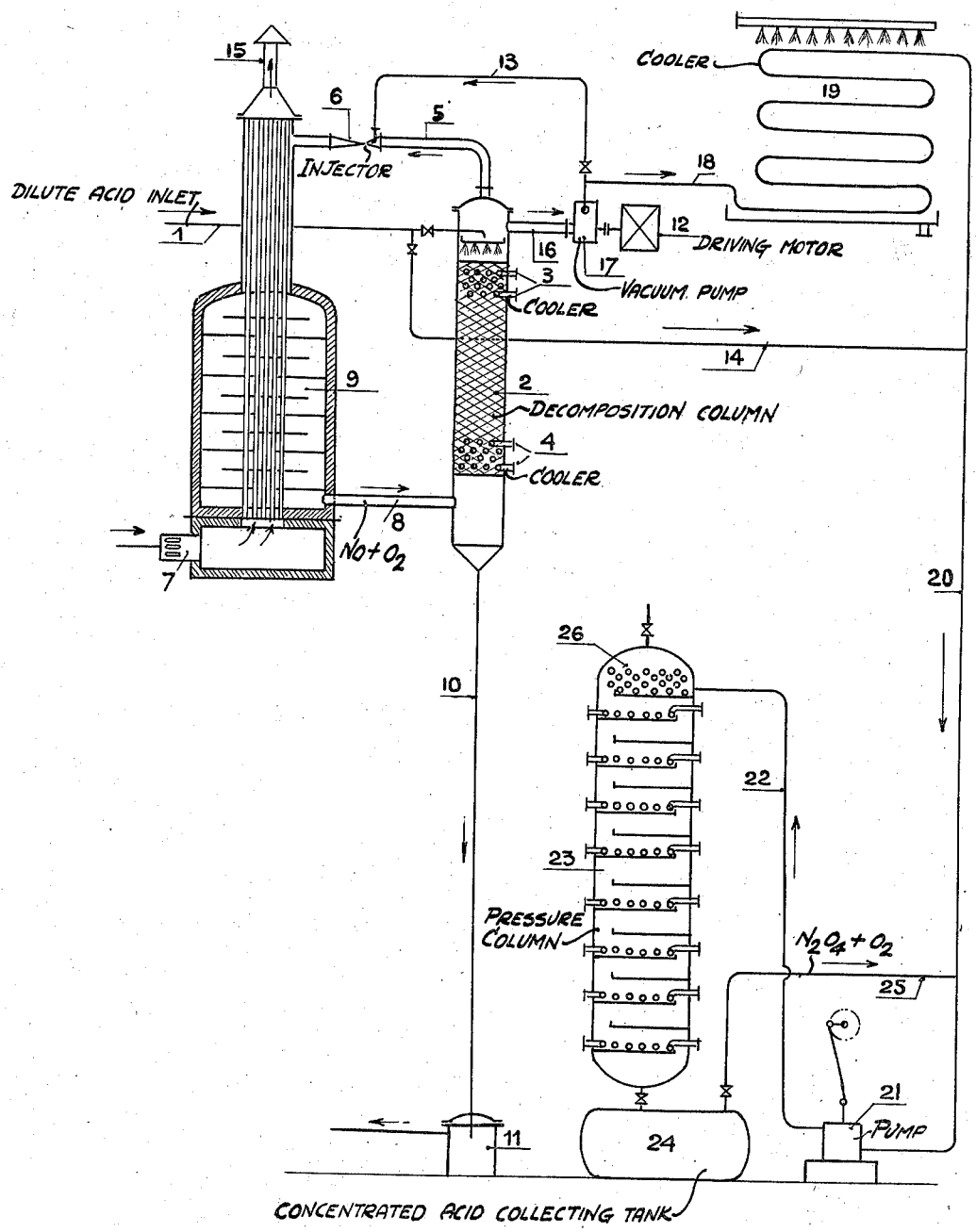
INVENTOR.
TADEUSZ HOBLER.
ATTORNEY.

UNITED STATES PATENT OFFICE 2,123,467

PROCESS FOR THE PRODUCTION OF HIGHLY CONCENTRATED NITRIC ACID

Tadeusz Hobler, Paris, France, assignor to Hydro Nitro S. A., Geneva, Switzerland Application August 12, 1935, Serial No. 35,870
In Germany August 13, 1934

4 Claims. (Cl. 23—160)

My invention relates to a process which permits the concentration of dilute nitric acid in a plant producing dilute acid by means of the oxidation of ammonia, in an economical manner, and without the use of sulphuric acid.

The usual oxidation of ammonia with air produces, as is well known, only moderately concentrated nitric acid (about 50% when pressure is not used and 62 to 64% acid under pressure). Highly concentrated nitric acid is made from this relatively dilute acid with the aid of materials which take away water, in particular, concentrated sulphuric acid. High concentrated nitric acid is also manufactured directly, without first making dilute acid, from oxides of nitrogen, produced by the oxidation of ammonia, in that the oxides of nitrogen are liquefied, with or without the use of pressure according as the oxidation is done with air or oxygen, and thereupon the liquefied nitrogen oxides are treated under pressure with oxygen and water (or dilute nitric acid) to produce concentrated nitric acid directly.

The pressure liquefaction can be carried out economically only where electricity is cheap. The oxidation of ammonia with oxygen is only economic where oxygen is to be found cheap, say as a byproduct. Elsewhere, in particular where nitric acid plants already exist producing dilute acid the general practice is to make concentrated acid by the use of sulphuric acid. The disadvantage of this process is the considerable heat required for denitrification and concentration of the sulphuric acid; also the operation of the plant is awkward and costly.

The basis of the process in this invention is the known reaction of disintegration of nitric acid:

$$NO + 2HNO_3 = 3NO_2 + H_2O$$

It has been suggested to enrich the $NO_2$ in the gases leaving the ammonia oxidation by bringing the NO in contact with $HNO_3$ before the NO has had a chance to oxidize to $NO_2$. In this way a certain enrichment of $NO_2$ takes place but on account of the presence of a great excess of $N_2$, in particular, this enrichment is not nearly enough to permit the production of highly concentrated nitric acid.

According to my invention, the $HNO_3$ in nitric acid containing water is decomposed by the use of gases containing NO, whereby the gases containing NO are obtained by decomposing $NO_2$ at high temperature 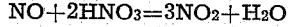.

According to the above indicated nitric acid decomposition reaction, one molecule of NO in reaction will give three molecules of $NO_2$.

The process is carried out in a circulation system, wherein, at one place the nitric acid is decomposed, and another place where one of the resulting three molecules of $NO_2$ is decomposed into NO and $1/2O_2$, and the resulting decomposition products returned to be used for the decomposition of nitric acid. In this way, in measure as dilute nitric acid is led into the system, a surplus of $NO_2$ and $O_2$ develops in the circulating gases. This surplus of $NO_2$ and $O_2$ (saturated of course with water vapor) is drawn out of the circulation system and after polymerization of $NO_2$ to $N_2O_4$, is converted with the necessary water (or dilute nitric acid) directly into concentrated nitric acid:

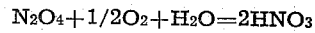

The circulation is best carried out under reduced pressure in order that on the one hand, the decomposition of $HNO_3$ be carried as far as possible and on the other hand to permit the use of lower temperatures for the decomposition of $NO_2$. Also under reduced pressure, the rate of reoxidation of NO by the oxygen will be decreased.

The gas steam mixture which is drawn out of the circulating system and which is destined for use in making concentrated nitric acid, consists in the main of the surplus of $NO_2$ and $O_2$ saturated with water vapor and nitric acid vapor and the ratios of amounts of $NO_2$ and $O_2$ are, according to their formation $80\% NO_2 : 20\% O_2$.

The drawing shows schematically an example of the working of the process.

Nitric acid of about 50% concentration coming from the ammonia oxidation absorption, flows through pipe 1 and enters the top of decomposition column 2 which is filled with tower packing (say Raschig rings). The hot dissociated gases coming from the dissociation furnace 9 enter the bottom of the decomposition tower 2 through the short pipe 8, and rise in counter current to the down flowing nitric acid. The diluted nitric acid containing the $HNO_3$ that has not been decomposed by the NO of the dissociated gases flows through pipe 10 into tank 11 and from here is sent back to one of the last stages of the nitric acid absorption.

The necessary heat for the decomposition of the nitric acid will be supplied by the sensible heat of the entering hot NO gases. In order to prevent any distillation, i. e. vaporization of the weak acid which has collected at the bottom of column 2, and which has to be removed therefrom, the temperature in the lower part of the decomposition column 2 must be held by means of cooler 4 beneath the boiling point of said acid which depends upon the pressure prevailing therein.

Part of the gases which have been enriched in $NO_2$ by the decomposition of nitric acid will be removed from the top of the decomposition column 2 through pipe 5 by means of injector 6 and sent to the dissociation furnace 9 where the dissociation of $NO_2$ into $NO+1/2O_2$ takes place at about 550° C. The dissociation furnace 9 may be heated as desired, for example: by gas or coke or by means of stack gases or electrically. To secure the desired dissociation of the $NO_2$ into NO and O, while preventing dissociation of the formed NO into N and O, the temperature in the dissociation furnace 9 must be held at a value between 500 and 800° C., calculable from the formula of Bodenstein:

$$\log K = -\frac{5749}{T} + 1.7 \log T - 0.0005T + 2.839$$

to be found, for instance, in Harry A. Curtis: "Fixed Nitrogen", page 394, and from the well-known formula:

$$K = \frac{(pNO)^2(pO_2)}{(pNO_2)^2}$$

where K is the equilibrium constant, T the absolute temperature, and $(pNO)$, $(pO_2)$ and $(pNO_2)$ the partial pressures of the NO, $O_2$ and $NO_2$ respectively.

After dissociation the dissociated gases containing NO and $O_2$ will be led back into decomposition column 2 through pipe 8 in order to decompose further dilute nitric acid.

The excess of gases containing $NO_2$ and $O_2$ will be led out of the circulation together with water vapor and nitric acid vapor, for example from the upper end of the decomposition column 2 through pipe 16 by means of vacuum pump 17. A part of these gases after having been compressed to about one atmosphere will be let into injector 6 through pipe 13 and expanded in the injector nozzles. A low pressure, of about 0.1 atmosphere absolute, is held in the circulation system by means of vacuum pump 17 driven by motor 12. This vacuum pump may be built for example like the well-known water-ring pump.

The gas-vapor mixture leaving vacuum pump 17 enters cooler 19 through pipe 18. The $HNO_3$ content of the condensate which separates out here would be about 60 to 70%. This condensate together with the uncondensed gases composed mainly of $NO_2$ and $O_2$ is led into pump 21 through pipe 20 and pumped against a pressure of about 20 to 50 atmospheres through pipe 22 into the pressure column 23. The $NO_2$ liquefies to $N_2O_4$ partly in the well cooled pump 21, partly at the inlet of pressure column 23 because of cooler 26. The pump 21 can be built of acid resisting steel and in a similar manner to a "bucket pump" provided with intensive cooling. The combination of the components to nitric acid takes place in the pressure column 23 according to the known reaction:

$$N_2O_4 + 1/2O_2 + H_2O = 2HNO_3$$

The resulting nitric acid of about 98% concentration will be led off to the collection tank 24. Whatever uncondensed gases remain absorbed in the liquid will be led back into the system through pipe 25.

In order to avoid reoxidation of the NO, the dissociated gases from the dissociation furnace 9 should be led as fast as possible into the decomposition column 2, where it is to decompose further amounts of dilute nitric acid entering the decomposition column 2. As hereby operated, for every molecule or reacting NO, 3 molecules of $NO_2$ result, and since in the dissociation furnace 9, one molecule of $NO_2$ gives one molecule of NO along with a half of a molecule of $O_2$, it is possible to lead out of circulation, without any regulation of composition, the constantly developing excess of gas, in such proportions of $NO_2$ and $O_2$ as are later necessary for the synthesis of nitric acid. The $H_2O$ necessary for the making of $HNO_3$ comes from the dilute nitric acid which is let into the decomposition column 2. Through the temperature regulation of the upper part of the decomposition column 2 by cooler 3 the amount of water vapor can be so determined, that the vacuum pump 17 will remove a gas-vapor mixture containing no more than the $H_2O$ necessary for $HNO_3$ synthesis; that is that the gas mixture, in the final result, contains the components $H_2O$, $NO_2$, and $O_2$ in stoichiometric ratios necessary to form $HNO_3$ directly. Accordingly the temperature in the upper part of the decomposition column 2, which of course depends on the pressure prevailing herein, must be adjusted so as to allow of removing just that steam quantity which is necessary for the formation of the $HNO_3$. When working, for instance, with a 50% acid, and at a pressure of 0.1 atmosphere absolute, as in the disclosed example, this will mean a temperature beneath 35.7° C., the value calculable from the partial pressure of the stoichiometrical steam quantity—provided that a 97% acid shall be produced; if a final product of different concentration is to be obtained, this temperature too will of course be different. (As for the connection between partial pressures and temperatures see the schedule in Gmelin's "Handbuch der anorganischen Chemie", page 978.)

If the cooling water available be cool enough, it is advisable to saturate the gas mixture to a less extent with water vapor, and add the $H_2O$ necessary for $HNO_3$ synthesis in the form of dilute nitric acid somewhere before pump 21, through pipe 14. In this way the capacity of the plant as a whole may be raised.

By means of the process described, highly concentrated nitric acid may be produced from nitric acid, of say 50% concentration, coming from an ammonia oxidation, without the use of sulphuric acid, and, contrary to the usual synthesis processes, without the expense of oxygen manufacture. The decomposition of the $NO_2$ to NO produces $O_2$ directly in the stoichiometric amounts needed for the $HNO_3$ synthesis which can be accomplished under pressure in known ways. The amounts of power and heat necessary for the process are very small.

I claim as my invention:—

1. A process for the manufacture of concentrated nitric acid from dilute nitric acid which comprises passing dilute nitric acid in counter current to a rising stream of hot gases containing NO and $O_2$ under pressure substantially below atmospheric to decompose the dilute nitric acid into $NO_2$ and $H_2O$, forming a gas containing $NO_2$, $O_2$ and $H_2O$ and residual undecomposed nitric acid, cooling the gases produced by the decomposition of the nitric acid to condense out a portion of the $H_2O$ and removing this $H_2O$ together with residual undecomposed nitric acid, removing a portion of the gases from the decomposition of the nitric acid to a decomposition chamber, decomposing the NO₂ in said gases under pressures substantially below atmospheric by heating into NO and O₂, leading the gases from the decomposition of the NO₂ into contact with further quantities of dilute nitric acid to decompose the same into NO₂ and H₂O, removing the remaining portion of the gases from the decomposition of the dilute nitric acid and converting them to nitric acid.

2. A process for the manufacture of concentrated nitric acid from dilute nitric acid which comprises continually passing dilute nitric acid through a reaction space in countercurrent to a rising stream of hot gases containing NO and O₂ under pressure substantially below atmospheric to decompose the dilute nitric acid into NO₂ and H₂O, forming a gas containing NO₂, O₂ and H₂O and residual undecomposed nitric acid, cooling the streaming gases produced by the decomposition of the nitric acid to continually condense out a portion of the H₂O, and continually removing this H₂O together with residual undecomposed nitric acid, continually removing a portion of the gases from the decomposition of the nitric acid to a decomposition chamber, decomposing the NO₂ in said gases under pressures substantially below atmospheric by heating into NO and O₂, continually leading back the gases from the decomposition of the NO₂ to the decomposition of the dilute nitric acid, bringing them here into contact with further quantities of dilute nitric acid to decompose the same into NO₂ and H₂O, continually removing the remaining portion of the gases from the decomposition of the dilute nitric acid and continually converting them to nitric acid.

3. A process according to claim 1, in which the water vapor content of the gases removed from the decomposition of the dilute nitric acid is so controlled, by regulation of the temperature during the decomposition, that the gas and vapor components will be present in said gases in the proper stoichiometric ratios permitting the making of nitric acid in the usual manner under pressure according to the reaction:

$$N_2O_4 + 1/2 O_2 + H_2O = 2HNO_3$$

4. A process according to claim 1, in which the water vapor content of the gases removed from the decomposition of the dilute nitric acid is reduced by cooling of the upper part of the reaction space wherein the dilute nitric acid is being decomposed, and the necessary water for the final conversion to nitric acid is added in the form of dilute nitric acid.

TADEUSZ HOBLER.